(12) United States Patent
Farwer

(10) Patent No.: US 6,237,836 B1
(45) Date of Patent: May 29, 2001

(54) PROTECTIVE GAS FOR TIG WELDING

(75) Inventor: Alfward Farwer, Meerbusch (DE)

(73) Assignee: Messer Griesheim GmbH (DE)

( * ) Notice: Subject to any disclaimer, the term of this patent is extended or adjusted under 35 U.S.C. 154(b) by 0 days.

(21) Appl. No.: 09/530,525

(22) PCT Filed: Oct. 23, 1998

(86) PCT No.: PCT/EP98/06746

§ 371 Date: May 1, 2000

§ 102(e) Date: May 1, 2000

(87) PCT Pub. No.: WO99/22901

PCT Pub. Date: May 14, 1999

(30) Foreign Application Priority Data

Nov. 3, 1997 (DE) .............................................. 197 48 482

(51) Int. Cl.⁷ ............................. B23K 33/00; B23K 9/16; B23K 9/173
(52) U.S. Cl. .............................................. 228/219; 219/75
(58) Field of Search ................................... 219/74, 75, 72, 219/137 R, 136; 228/219, 214, 42

(56) References Cited

U.S. PATENT DOCUMENTS

| | | | |
|---|---|---|---|
| 3,582,604 | * | 6/1971 | Konjushenny et al. . |
| 5,210,388 | * | 5/1993 | Farwer . |
| 5,210,389 | * | 5/1993 | Farwer . |
| 5,296,676 | * | 3/1994 | Gilman . |
| 5,347,098 | * | 9/1994 | Murakami et al. . |
| 5,667,703 | * | 9/1997 | Soula et al. . |
| 5,686,002 | * | 11/1997 | Flood et al. . |
| 5,714,729 | * | 2/1998 | Yamada et al. . |

* cited by examiner

*Primary Examiner*—Patrick Ryan
*Assistant Examiner*—Jonathan Johnson
(74) *Attorney, Agent, or Firm*—Connolly Bove Lodge & Hutz LLP

(57) ABSTRACT

The invention relates to a protective gas for TIG welding of metals, especially high alloy or low alloy steel, whose thermal conductivity is lower than that of aluminium. The inventive gas consists of argon, helium and hydrogen and enables significant improvements to be made in electric arc stability, welding speed, oxidation of weld surface and adjacent area, flow-on performance and weld appearance.

8 Claims, No Drawings

PROTECTIVE GAS FOR TIG WELDING

The invention relates to an inert gas for TIG welding of metals, the thermal conductivity of which is below that of aluminium, in particular high-alloy or low-alloy steels, with argon as the principal component of the gas.

It is known from publications that TIG welding of metals with a thermal conductivity below that of aluminium, in particular high-alloy or low-alloy steels, is carried out with argon as the inert gas. To improve the welding efficiency, other gases, in particular 2–10% of hydrogen, have frequently been added to the argon. Nevertheless, the welding results using such inert gases vary depending on the material composition and the welding filler material.

The following problems are encountered during TIG welding using the known inert gases:

insufficient arc stability welding speed too low oxidation of the seam surface flow performance only moderate weld appearance (uneven weld ripples)

poor suitability for out-of-position welding poor gap bridging ability.

The invention is based on the object of providing an inert gas which makes it possible to improve efficiency of TIG welding while maintaining suitability for out-of-position welding.

This object is achieved by means of the features of claim 1.

The features of claim 1 advantageously result in an improved arc stability, an increase in the welding speed, reduced oxidation of the seam surface, an improved flow performance and uniform weld ripples.

In this context, the principal gas component in a gas mixture is understood to mean a gas component which forms at least 90% by volume in the gas mixture. The inert gas mixture generally contains at least 90% by volume argon as principal gas component, preferably at least 95% by volume argon.

It has been found that, with a view to good suitability for out-of-position welding, a high welding speed, low oxidation of the seam surface and reliable penetration, particularly advantageous results are achieved if the inert gas contains from 0.15 to 1.5% by volume hydrogen, preferably 0.25 to 1.2% by volume hydrogen, and particularly preferably 0.35 to 0.9% by volume hydrogen, from 0.5 to 9% by volume helium, preferably from 0.8 to 5% by volume helium, and particularly preferably 1.2 to 3.5% by volume helium, remainder argon, i.e. the total of the hydrogen, helium and argon contents amount to 100% by volume of the overall gas mixture. Furthermore, it has proven particularly advantageous to use a ratio of the volumetric fractions (expressed in per cent by volume) of hydrogen to helium in the range from 1:2 to 1:8, in particular in the range from 1:3 to 1:5. Outside these ratio ranges, either the oxidation behaviour or the suitability for out-of-position welding or both deteriorate(s) significantly.

The following examples explain the invention.

EXAMPLE

In tests, a plurality of novel gas mixtures were tested as to whether them improve previous problems encountered with argon or argon mixtures, and extensive experiments were carried out. Examples of preferred inert gases are given in the table. The tests showed that if 0.15–15% by volume hydrogen and 0.5–9.0% by volume helium were added to a residual argon volume up to 100%, the arc stability was improved, the welding speed was increased, the oxidation of the weld surface was reduced, the flow performance was improved and the weld ripples became uniform. This was combined with good suitability for out-of-position welding and gap-bridging ability.

For comparison purposes, high-alloy steels were welded using the TIG process using the known inert gases argon, argon containing 2% hydrogen, argon containing 5% hydrogen and argon containing 7% hydrogen.

The series of tests carried out using the inert gases comprising the mixture constituents argon, helium and hydrogen resulted in considerable improvements in the suitability for out-of-position welding, the welding speed in position F (vertical upward), the oxidation behaviour in position F (vertical upward), and, in particular compared to pure argon, quicker welding in positions A, B (A: horizontal; B: vertical).

TABLE

Composition of preferred inert gases

| Ar/% by volume | $H_2$/% by volume | He/% by volume | Preferred use |
|---|---|---|---|
| 97.85 | 0.35 | 1.8 | Universal |
| 96.2 | 0.8 | 3.0 | Universal |
| 95.8 | 1.2 | 3.0 | Thick sheets |
| 95.4 | 0.6 | 4.0 | Thin sheets |

What is claimed is:

1. Inert gas for TIG welding of metals, the thermal conductivity of which is lower than that of aluminium, in particular high-alloy and low-alloy steels, consisting of argon, 0.15 to 1.5% by volume hydrogen and 0.5 to 9% by volume helium.

2. Inert gas according to claim 1, characterized in that the inert gas contains 0.25 to 1.2% by volume hydrogen and 0.8 to 5% by volume helium.

3. Inert gas according to claim 2, characterized in that the inert gas contains 0.35 to 0.9% by volume hydrogen and 1.2 to 3.5% by volume helium.

4. Inert gas according to claim 3, characterized in that the ratio of the volumetric fractions, in per cent by volume, of hydrogen to helium lies in the range from 1:2 to 1:8.

5. Inert gas according to claim 3, characterized in that the ratio of the volumetric fractions, in per cent by volume, of hydrogen to helium lies in the range from 1:3 to 1:5.

6. Inert gas according to claim 1 characterized in that the inert gas contains 0.35 to 0.9% by volume hydrogen and 1.2 to 3.5% by volume helium.

7. Inert gas according to claim 1 characterized in that the ratio of the volumetric fractions, in per cent by volume, of hydrogen to helium lies in the range from 1:2 to 1:8.

8. Inert gas according to claim 1 characterized in that the ratio of the volumetric fractions, in per cent by volume, of hydrogen to helium lies in the range from 1:3 to 1:5.

* * * * *